June 9, 1959 D. M. THOLL ET AL 2,889,930
SELF DISCHARGING BASE BEARING CENTRIFUGAL
Filed Aug. 2, 1956 3 Sheets-Sheet 1

Inventors
David Tholl
Nick S. Sorensen
Attorney

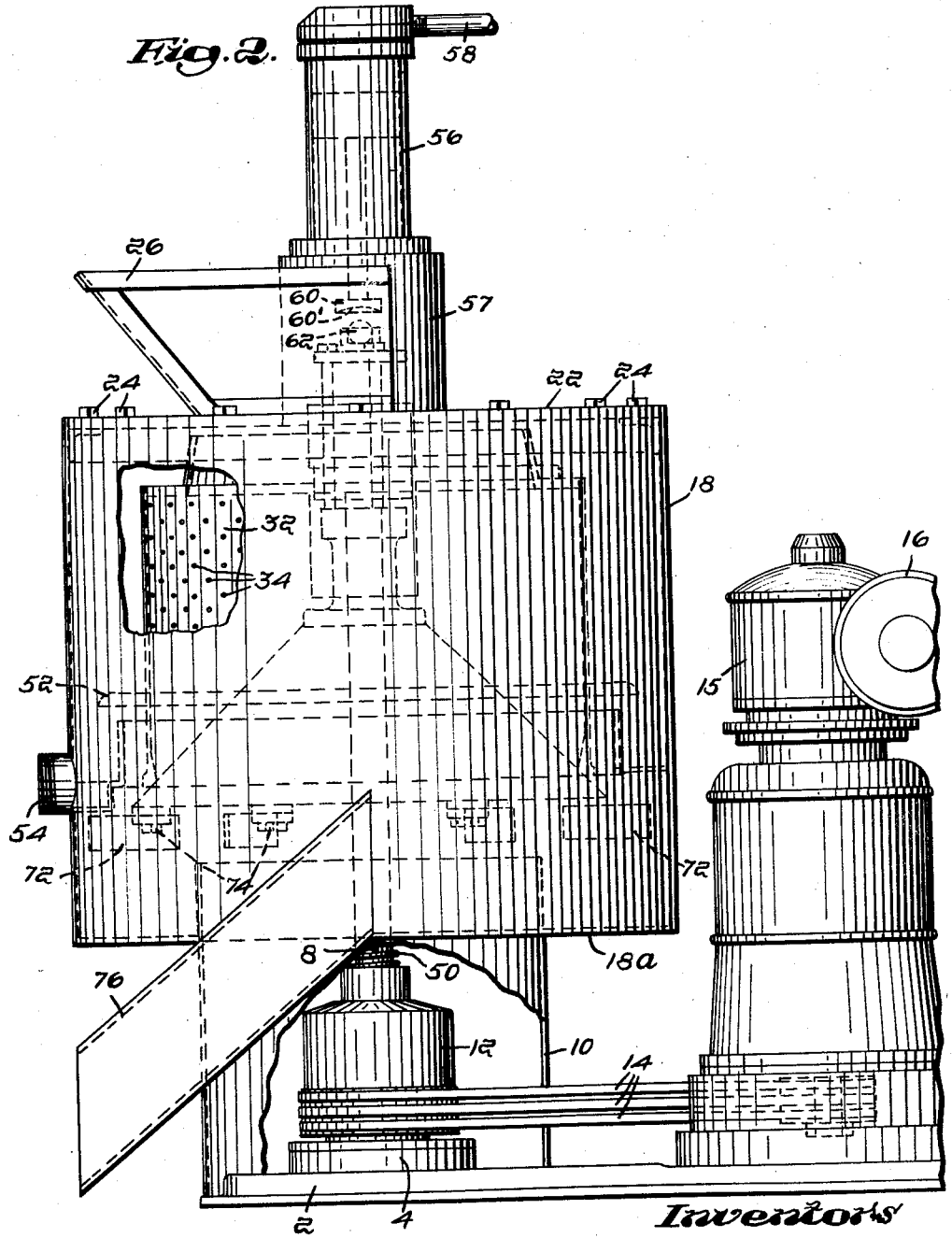

2,889,930
SELF DISCHARGING BASE BEARING CENTRIFUGAL

David M. Tholl, Needham, and Niels J. Sorensen, Westwood, Mass.

Application August 2, 1956, Serial No. 601,777

4 Claims. (Cl. 210—369)

This invention relates to a machine of the class generally referred to as a "centrifugal" for use in subjecting a mixture of fluid and solid material to a centrifuging operation in order to separate and remove the fluid component in a rapid and efficient manner.

In one specific aspect, the invention is concerned with the handling and centrifuging of a mass of oil bearing metal chips such as is commonly produced in the course of certain machine tool forming operations and it is a principal object of the invention to provide a simplified and efficient mechanism for drying oil bearing metal chips either continuously or in separate batches so that the oily component is substantially removed. Another object of the invention is to devise an improved centrifugal which includes means for providing a rapid and positive removal of chips from a centrifuging chamber and discharge of the chips into a suitable collecting hopper with a minimum of supervision by an operator. It is a still further object of the invention to provide an organization of centrifugal parts which not only comprises means for carrying out the operations above outlined but which also is of an exceedingly rugged construction capable of withstanding stresses developed in operating the centrifugal through a range of high rotative speeds.

These and other objects and novel features will be more fully understood and appreciated from the following description of a preferred embodiment of the invention selected for purposes of illustration and shown in the accompanying drawings, in which—

Fig. 2 is a side elevational view of the centrifugal showing internal parts in one position of adjustment;

Figure 1:
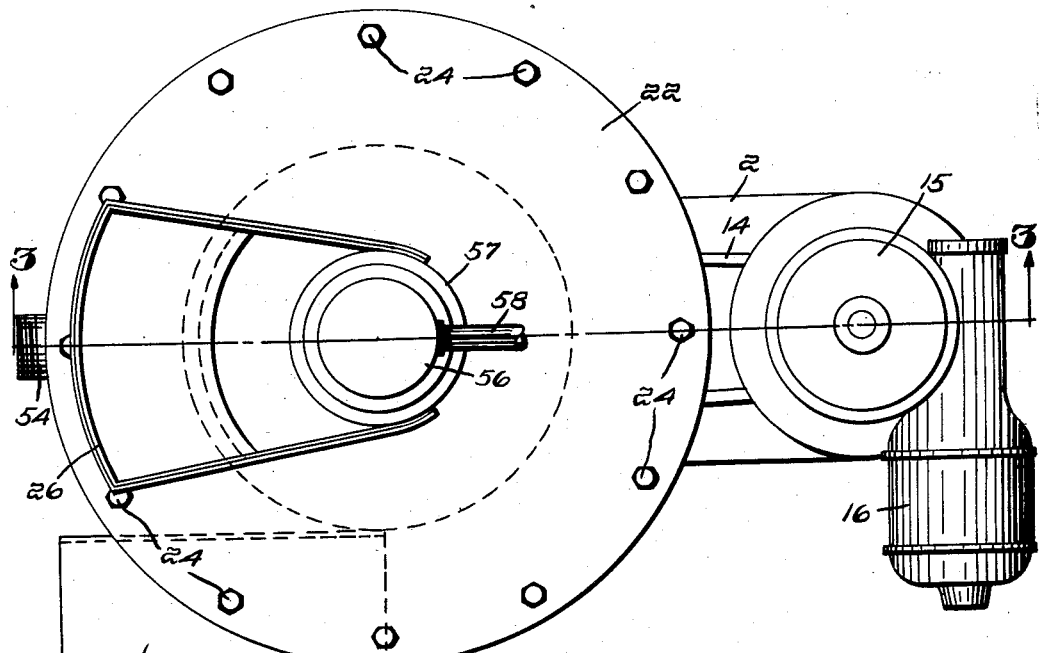
Fig. 1 is a plan view of the centrifugal of the invention.
Figures 4, 5:
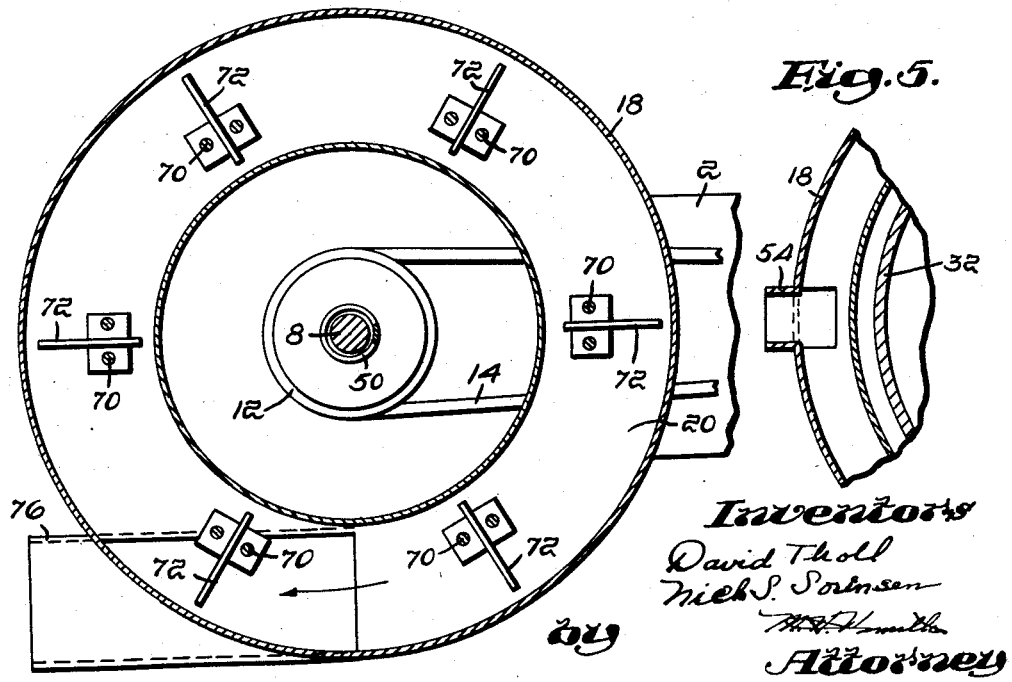
Fig. 4 is a cross-sectional view taken on the line 4—4 of Fig. 3.
Fig. 5 is a horizontal fragmentary showing the outlet portion of the centrifugal.
Figure 3:
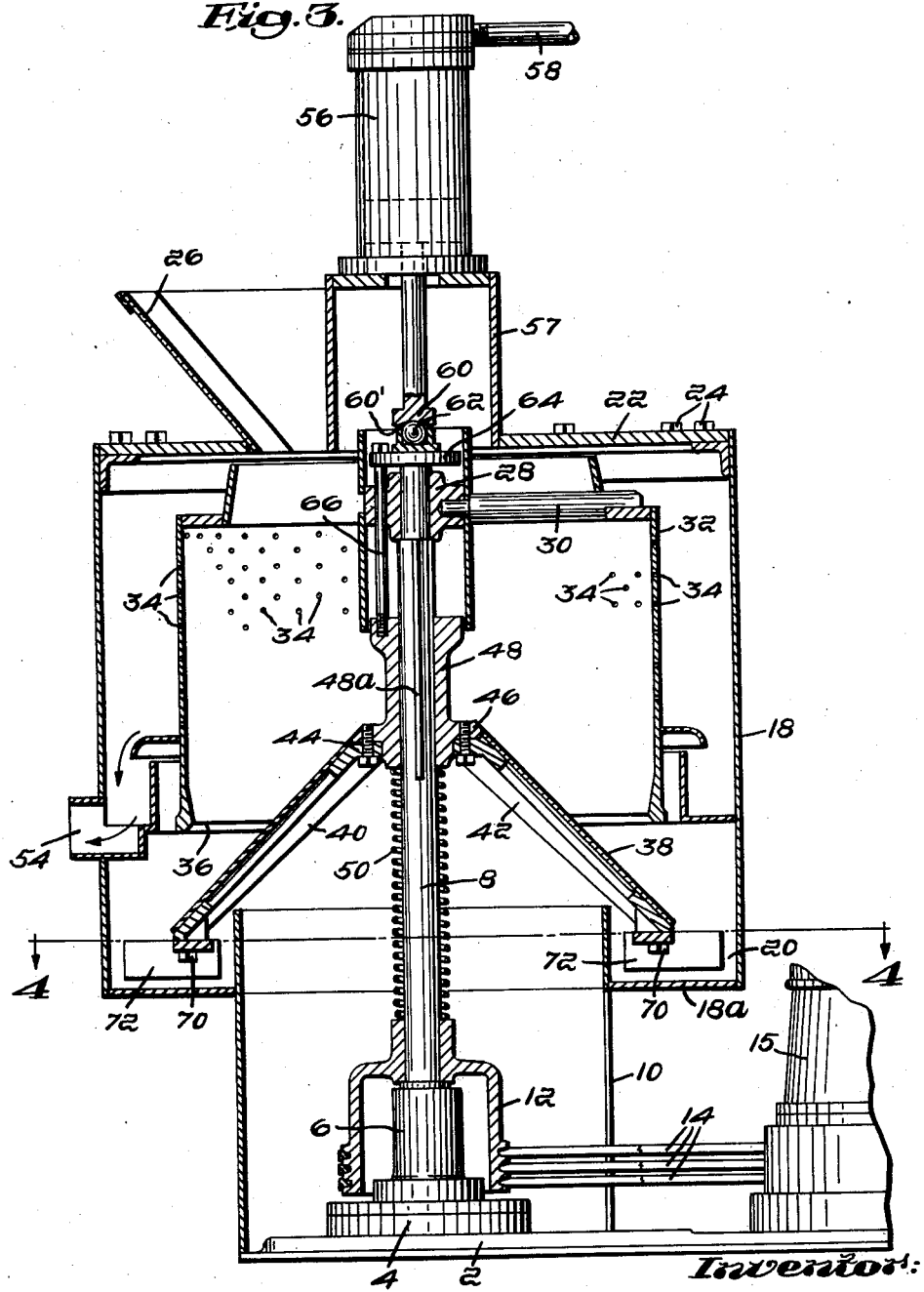
Fig. 3 is a cross-sectional view taken on the line 3—3 of Fig. 1 further illustrating the internal mechanism in a second position of adjustment.

In the structure shown, numeral 2 denotes a base on which is solidly secured a bearing support 4 having a bearing mount 6 extending vertically upwardly therefrom. Rotatably mounted in the bearing member 6 is a vertically disposed drive shaft 8. Also located around bearing 6 and shaft 8 in spaced relation thereto is a housing body 10 which projects upwardly for a short distance, as shown in Figs. 2 and 3.

Fixed to the shaft 8 at a point immediately above the bearing 6 is a pulley member 12 which is connected by belts 14 through reduction gear means 15 to a motor 16. By means of the arrangement described, the shaft 8 may be rotated at relatively high speeds of a magnitude suitable for carrying out a centrifuging operation.

The housing 10 has supported thereon a curb member 18 which is constructed of a diameter appreciably exceeding the diameter of the housing so as to provide for an annular bottom section 18a. This annular bottom section is arranged to bridge the space between the curb member and housing at points well below the top edge of the housing 10 to form an annular channel 20, as best shown in Fig. 3. At its upper side, the curb member 18 is closed by a top plate section 22 detachably secured by screws as 24 and having an opening therein communicating with which is a loading chute 26.

At points along the upper section of the shaft 8, and within the curb, is solidly fixed a spider consisting of a hub portion 28 from which extends radially outwardly a plurality of supporting arms as 30. Welded or otherwise secured to the extremities of these supporting arms 30 is a basket 32 of the class commonly employed in centrifugals and having located through its side wall portions a multiplicity of centrifuging apertures 34.

The basket 32 is open at its lower end to define a flanged circular seat 36 against which is arranged a novel reciprocating bottom member of the invention. This bottom member is adapted to periodically open and close the lower side of the basket 34 and consists of a cone-shaped element 38 supported on conically disposed bars as 40 and 42. These bars are secured in turn by bolts as 44 which pass through a flange portion 46 of a sleeve member 48 slidably keyed on the shaft 8 by a key member 48a, as shown in Figs. 2 and 3. Located between the sleeve member 48 and the pulley 12 is a coiled spring 50 which normally operates to resiliently maintain the conical member 38 against the circular seating surface 36 of the basket 32 in a position so as to contain a material which has been loaded into the basket 32 through the loading chute 26.

This seated position of the conical member has been suggested in dotted lines in Fig. 2 and it will be apparent that there is thus comprised a fluid type enclosure and that when a mixture of fluid and solid particles is rotated in the basket 32, centrifugal force will act to displace fluid through the passageways 34 and outwardly over a baffle 52 and then out through drainage passageways as 54.

The operation of thus centrifuging material in the basket leaves a residue of metal chips, for example, which can be discharged in accordance with the invention by lowering the conical member 38 out of contact with its seating surface 36. This is achieved in one convenient manner, for example, by means of an air cylinder 56 of the class described in the centrifuged structure in Patent No. 2,755,991 owned by the assignee of the present invention, located at the upper side of the curb top 22 on a tubular support 57 as shown in Figs. 2 and 3. This air cylinder, 56, when hydraulically actuated by fluid forced through a conduit 58, operates a plunger 60 having a ball seat 60'. A ball 62 is carried on a slide mechanism consisting of a plate 64 and vertical rods as 66 whose lower ends are threaded into the members 48 as shown in Figs. 2 and 3. Actuating the air cylinder 56 forces the plunger 60 against the ball 62 which in turn slides the sleeve member 48 and the cone member 38 downwardly away from the seating surface 36. Fig. 2 shows the cone member in a seated position and the air cylinder 56 retracted. Fig. 3 shows the air cylinder in an extended position and the cone member displaced to provide an annular passageway while chips may be discharged into the bottom of the curb 18 so that these chips collect along the annular passageway 20.

We also combine with this cone shaped member, discharger shoe elements for moving the chips from the annular passageway 20. The discharger shoe elements are denoted by numerals 70 and 72 and consist of thin blades secured in a vertically suspended position at the bottom outer edge of the cone member 38, as best shown in Fig. 3. It will be apparent that since the sleeve 48 is keyed to shaft 8, rotative movement may be imparted to the discharger shoes by the shaft 8. A discharge chute 76 communicates with the annular passageway 20 so that chips in the passageway 20 will be pushed around and at one point will be forced out through the discharge chute onto a conveyor or other collecting medium.

It will be understood that the shaft 8 is operated at different speeds as is common in the centrifugal art and the movement of chips by the shoes 72 will take place at a relatively slow rotative speed, controlled by a standard timing cycle, or in some other desirable manner.

From the foregoing it will be seen that we have disclosed a novel means of releasing centrifuged chips or similar solid material and guiding the released chips into an annular passageway where they may be swept into a discharge chute in a highly convenient manner. By holding the conical bottom member in a fully seated position, the operation of removing fluid material may be rapidly and efficiently carried out and the entire organization of parts is carefully chosen to provide a rugged construction adapted to a wide range of centrifugal speeds.

While we have shown a preferred embodiment of the invention, it will be understood that changes and modifications may be resorted to within the scope of the appended claims.

We claim:

1. An improved centrifugal comprising a base, a curb supported on said base, a vertical drive shaft mounted in the base and located axially through the curb, a basket fixed to the shaft for rotative movement therewith, said basket having its bottom recessed to provide an annular flange seat and a discharge port located therethrough, a cone-shaped body slidably disposed on the vertical drive shaft for moving into and out of seated relationship against the said annular flange, spring means for normally maintaining the cone-shaped body in a seated position against the basket flange and means for periodically displacing the cone-shaped body vertically downwardly to open said discharge chute while said basket and drive shaft are rotating.

2. A structure according to claim 1 in which the means for vertically displacing the cone-shaped body comprises a plunger, ball and socket means for operatively connecting said plunger to the cone-shaped body while the cone-shaped body is revolving and means for actuating said plunger.

3. An improved centrifugal comprising a base, a curb supported on said base and forming an annular bottom passageway therearound, a vertical drive shaft mounted in the base and located axially through the curb, a basket fixed to the shaft for rotative movement therewith, a reciprocating conical bottom for the basket adapted to open and close an aperture therein spring means for normally supporting the conical bottom in sealed relation to the basket, said conical bottom structure including a bearing support rigidly secured at the upper side thereof, a ball socket and ball assembly mounted on said bearing support to constitute one part of a two-piece bearing structure, plunger means vertically mounted above the upper side of the curve and presenting a cup shaped bearing component fixed at its lower extremity and hydraulic means for forcing said cup shaped bearing component downwardly into rotative engagement with the ball socket and ball assembly while said assembly is revolving thereby to lower the conical bottom structure away from the basket and to define a discharge aperture, discharger shoe means forming a part of the conical bottom for displacing material passing from the basket into the annular passageway and discharge chute means communicating with the passageway and adapted to conduct chips from the annular passageway.

4. An improved centrifugal comprising a base, a curb supported on said base, a vertical drive shaft mounted in the base and located axially through the curb, a basket fixed to the shaft for rotative movement therewith, a conical reciprocal bottom for said basket consisting of a plunger and cup bearing means operatively connected to said conical bottom and adapted to force the conical bottom, while revolving, downwardly to define a discharge passageway, and discharger shoe means secured to said conical bottom for rejecting material passing downwardly from the basket.

References Cited in the file of this patent

UNITED STATES PATENTS

| | | |
|---|---|---|
| 351,416 | Weston | Oct. 26, 1886 |
| 498,383 | Duncan | May 30, 1893 |
| 778,458 | Morrison | Dec. 27, 1904 |